(12) United States Patent
Numata

(10) Patent No.: US 8,582,162 B2
(45) Date of Patent: Nov. 12, 2013

(54) INFORMATION PROCESSING APPARATUS, OUTPUT METHOD, AND STORAGE MEDIUM

(75) Inventor: Masahito Numata, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 197 days.

(21) Appl. No.: 13/191,310

(22) Filed: Jul. 26, 2011

(65) Prior Publication Data

US 2012/0033254 A1  Feb. 9, 2012

(30) Foreign Application Priority Data

Aug. 6, 2010 (JP) ................................. 2010-177960

(51) Int. Cl.
*G06F 15/00* (2006.01)
(52) U.S. Cl.
USPC .......................................................... 358/1.15
(58) Field of Classification Search
USPC ....................................................... 358/1.15
See application file for complete search history.

(56) References Cited

U.S. PATENT DOCUMENTS

2013/0050735 A1*  2/2013  Nuggehalli et al. ......... 358/1.13

FOREIGN PATENT DOCUMENTS

| JP | 2002-82867 A | 3/2002 |
| JP | 2005-92599 A | 4/2005 |

* cited by examiner

*Primary Examiner* — Saeid Ebrahimi Dehkordy
(74) *Attorney, Agent, or Firm* — Canon USA, Inc., IP Division

(57) ABSTRACT

An information processing apparatus may include a conversion unit, a transmission unit, and an instruction unit. The conversion unit acquires document data from a document management apparatus in response to a conversion request transmitted from an external device in a case where it is detected that a predetermined document operation is performed on the document data and converts the acquired document data into print data to be used by an image forming apparatus to output the document data. The transmission unit transmits to the image forming apparatus the print data converted from the document data by the conversion unit. The instruction unit instructs the image forming apparatus to output document data transmitted from the transmission unit in response to an output request transmitted from the external device in a case where it is detected that an output operation of outputting the document data is performed.

19 Claims, 15 Drawing Sheets

FIG. 9

| DOCUMENT IDENTIFIER | DOCUMENT SAVING LOCATION | DOCUMENT VERSION | CONVERSION DATE AND TIME | PRINT DATA | TRANSFER DESTINATION PRINTER | REQUESTING USER |
|---|---|---|---|---|---|---|
| xxxxxxx | http://xxx.xxx.xxx/xxx | 1.12 | 2010/2/20 15:43:50 | SPECIFICATION.pdf SPECIFICATION.xps SPECIFICATION.xxx | Printer A Printer B Printer C | user A |
| yyyyyyy | http://xxx.xxx.yyy/yyy | 2.31 | 2009/12/20 10:43:50 | MANAGERIAL-DECISION-REQUEST.pdf MANAGERIAL-DECISION-REQUEST.xxx | MFP A Printer K | user G |
| zzzzzzz | local | 1.00 | 2010/1/15 10:00:05 | GRAPH.pdf GRAPH.xps GRAPH.xxx | | user Y |

901  902  903  904  905  906  907

INFORMATION PROCESSING APPARATUS, OUTPUT METHOD, AND STORAGE MEDIUM

BACKGROUND OF THE INVENTION

1. Field of the Invention

The present invention relates to an information processing apparatus, an output method, and a program.

2. Description of the Related Art

Document management systems utilizing Internet technology have become widely used. In the document management system, users access Web pages established by server computers from client computers via the Internet. Then, the users browse and edit documents (document data) using the Web pages.

In recent years, technology, such as a cloud-computing system and "software as a service" (SaaS), has been being utilized as a configuration for performing various processing in server computers. Accordingly, the importance of technology for editing a document on the Internet and printing the document utilizing a print server on the Internet has increased.

For example, Japanese Patent Application Laid-Open No. 2002-82867 discusses a method for printing contents on the network, which are browsed by a user with a client computer, by a printer. Further, for example, Japanese Patent Application Laid-Open No. 2005-92599 discusses a method for retrieving a document having low probability of being changed by a user and for preliminarily converting the retrieved document into print data to thereby reduce a time taken by a printer to print out a first page of the document.

The method discussed in Japanese Patent Application Laid-Open No. 2002-82867 includes an issue in that because the contents are converted into printable print data at the timing that a user instructs the printer to print the contents, it may take time to print out from the user's print instruction. The method discussed by Japanese Patent Application Laid-Open No. 2005-92599 includes an issue in that because a document having low probability of being changed by a user is converted into print data, if the document which has highest probability of being printed is being operated by a user, the time taken by the printer to print out a first page of the document cannot be reduced.

SUMMARY OF THE INVENTION

The present invention is directed to a technique for more reducing time taken to start output of document data currently operated in an image forming apparatus. Accordingly, time taken to start, in an image forming apparatus, output of document data currently operated can be more reduced.

According to an aspect of the present invention, an information processing apparatus includes: a conversion unit configured to acquire document data from a document management apparatus in response to a conversion request transmitted from an external device in a case where it is detected that a predetermined document operation is performed on the document data and convert the acquired document data into print data to be used by an image forming apparatus to output the document data; a transmission unit configured to transmit to the image forming apparatus the print data converted from the document data by the conversion unit; and an instruction unit configured to instruct the image forming apparatus to output document data transmitted from the transmission unit in response to an output request transmitted from the external device in a case where it is detected that an output operation of outputting the document data is performed.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 9 illustrates an example of a data structure of print management information.

DESCRIPTION OF THE EMBODIMENTS

Various exemplary embodiments, features, and aspects of the invention will be described in detail below with reference to the drawings.

Figure 1:
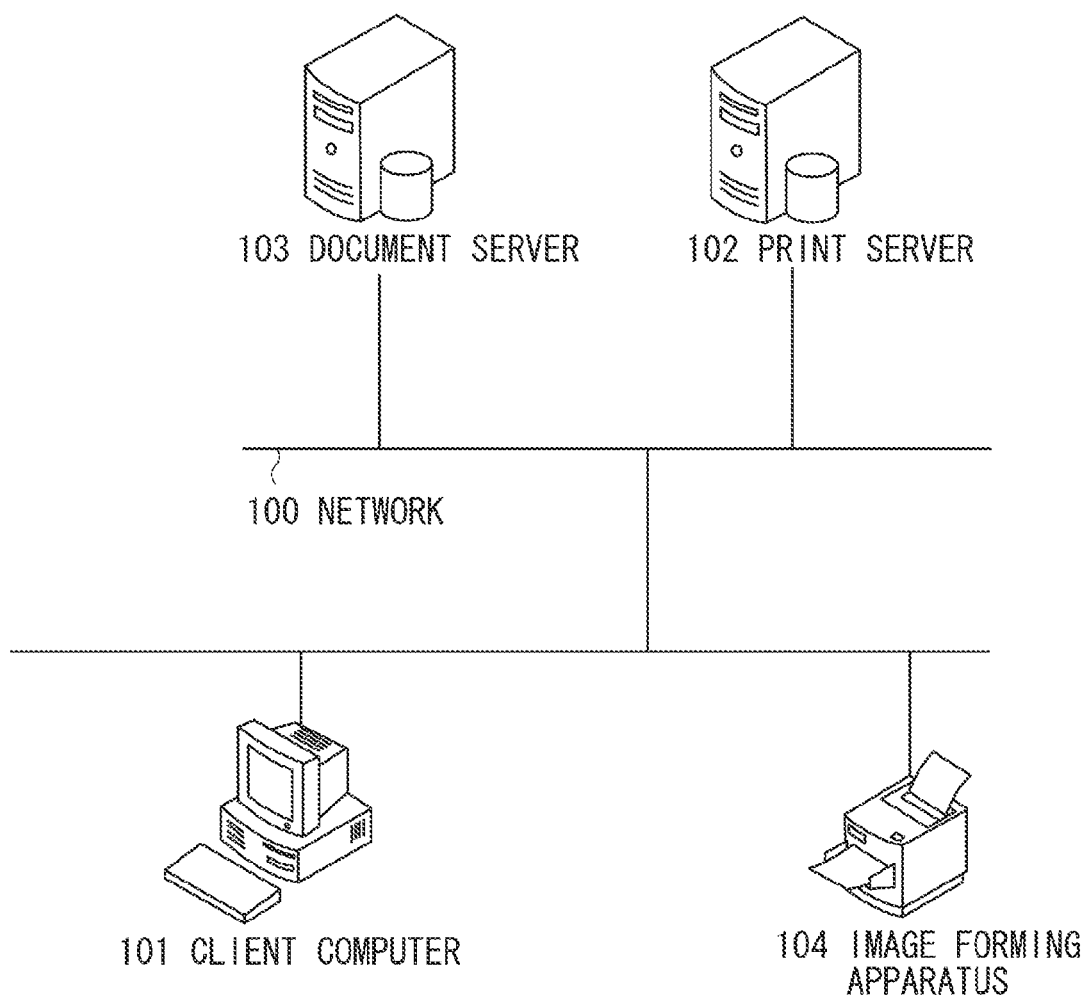
FIG. 1 illustrates an example of a configuration of a network print system.

FIG. 1 illustrates an example of a configuration of a network print system according to a first exemplary embodiment. In the network print system, a plurality of apparatuses (e.g., a print server 102, a document server 103, an image forming apparatus 104, and a client computer 101) are connected to one another via a network 100. The network 100 is an example of a communication line for exchanging information among the apparatuses. The type of the network 100 can be either the Internet or an intranet. In addition, the network 100 can be wired or wireless.

The configuration of the network print system is not limited to the above one. For example, the print server 102 can have functions of the document server 103 (serving as an example of a document management apparatus). In addition, a plurality of servers can realize the functions of the print server 102. Although the image forming apparatus 104 is illustrated in FIG. 1 as a single apparatus, the network print system can include a plurality of image forming apparatuses. The client computer 100 is not limited to a personal computer. The client computer 100 can be an apparatus, such as a portable terminal and an image forming apparatus, having the same function as that of the personal computer.

Figure 2:
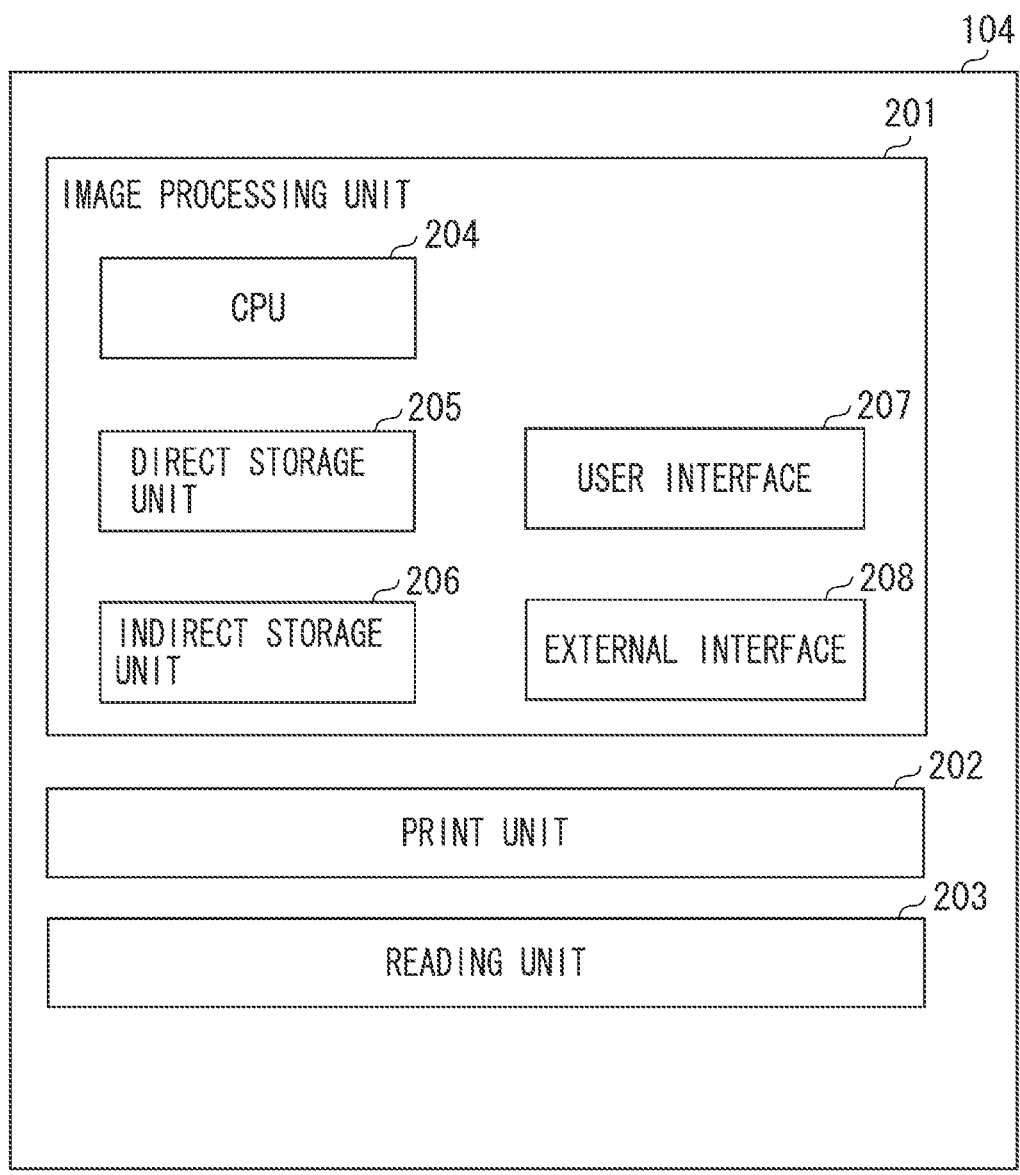
FIG. 2 illustrates an example of a hardware configuration of an image forming apparatus.

Next, a configuration of each apparatus of the network print system is described in detail. FIG. 2 illustrates an example of a hardware configuration of the image forming apparatus 104.

The image forming apparatus 104 is a multi-function peripheral, a printer or the like having functions such as print, facsimile (FAX), scanner, and copy functions. The image forming apparatus 104 is configured to include an image processing unit 201, a print unit 202, and a reading unit 203. The image processing unit 201 is configured to include a central processing unit (CPU) 204, a direct storage unit 205, an indirect storage unit 206, a user interface 207, and an external interface 208. In the present exemplary embodiment, the CPU includes one or more processors. Although the present exemplary embodiment employing printing as an example of a method of outputting a document (document data) by the image forming apparatus 104 is described below, the method of outputting a document according to the present exemplary embodiment is not limited thereto.

The CPU 204 is a unit that executes various programs and instructs various operations of controlling the image processing apparatus 104. The direct storage unit 205 is a work memory to be used when the CPU 204 executes a program. The programs executed by the CPU 204 are loaded into the direct storage unit 205. The direct storage unit 205 is implemented by a random access memory (RAM) or the like.

The indirect storage unit 206 stores various programs such as application programs. In addition, the indirect storage unit 206 can store various pieces of data. The programs stored in the indirect storage unit 206 are loaded into the direct storage unit 205 when the CPU 204 executes the program. The indirect storage unit 206 is implemented by a solid state drive (SSD), a hard disc drive (HDD) or the like.

A print process executed by the image processing apparatus 104 is described. According to the present exemplary embodiment, in the image forming apparatus 104, printing software for receiving a print start request based on a user operation operates. The printing software receives print data, print setting data, and the like according to a communication protocol, e.g., a hyper text transfer protocol (HTTP) from the print server 102 connected thereto via the network 100. If necessary, the printing software performs a process for combining print data with print setting data.

The printing software performs printing based on the print data and the print setting data by controlling the print unit 202 and the like. Although the print data and the print setting data are described by being separated from each other, the print data and the print setting data can be treated as one piece of print data.

The user interface 207 is a unit that receives a process request from a user. The user interface 207 receives a signal corresponding to an instruction input by a user via an input device, such as a keyboard, or a mouse.

The external interface 208 receives data from an external device and transmits data thereto. The external device is, e.g., an external storage device, such as an external HDD or an external universal-serial-bus (USB) memory, and a separate apparatus, such as a separate host computer or a separate image forming apparatus, connected to the external interface 208 via the network 100. In addition, the image forming apparatus 104 can communicate with the client computer 101, the print server 102, and the like via the network 100.

Figure 3:
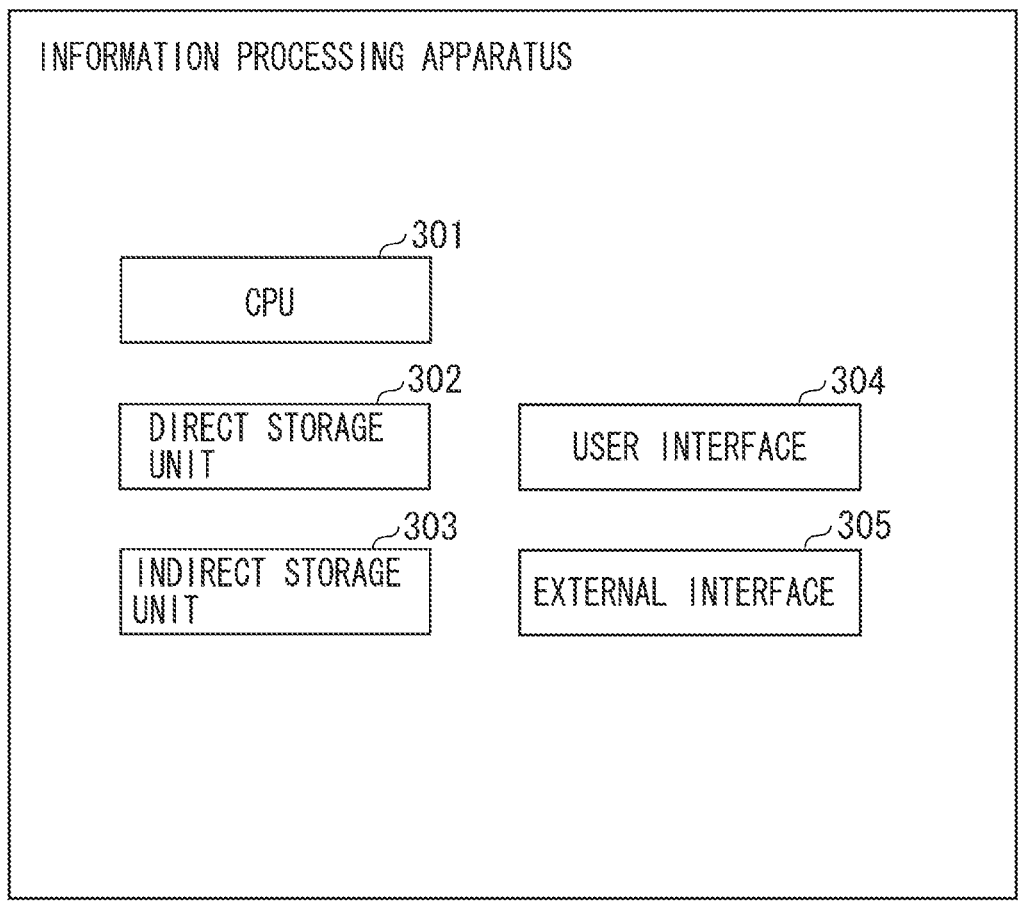
FIG. 3 illustrates an example of a hardware configuration of an information processing apparatus.

Next, the configuration of the information processing apparatus (computer) employable as the client computer 101, the print server 102, or the document server 103 is described below. FIG. 3 illustrates an example of a hardware configuration of the information processing apparatus.

The information processing apparatus is configured to include a CPU 301, a direct storage unit 302, an indirect storage unit 303, a user interface 304, and an external interface 305.

The CPU 301 is a unit that executes various programs and instructs various operations of controlling the information processing apparatus. The direct storage unit 302 is a work memory to be used when the CPU 301 executes a program. The programs executed by the CPU 301 are loaded into the direct storage unit 302. The direct storage unit 302 is implemented by a RAM or the like.

The indirect storage unit 303 stores various programs such as application programs, and operating system (OS) programs. The programs stored in the indirect storage unit 303 are loaded into the direct storage unit 302 when the CPU 301 executes the program. In other words, the CPU 301 performs the processing according to procedures of the programs stored in the indirect storage unit 303. Accordingly, functions of the information processing apparatus, and processing according to a flowchart, which will be described below, are implemented. The indirect storage unit 303 also stores various pieces of data. The indirect storage unit 303 is implemented by a ROM, a HDD, or the like.

The user interface 304 is a unit that receives a process request from a user. The user interface 304 receives a signal corresponding to an instruction input by a user via an input device, such as a keyboard, or a mouse. The external interface 305 is connected to the network 100 and communicates with other devices connected to the network 100.

Figure 4:
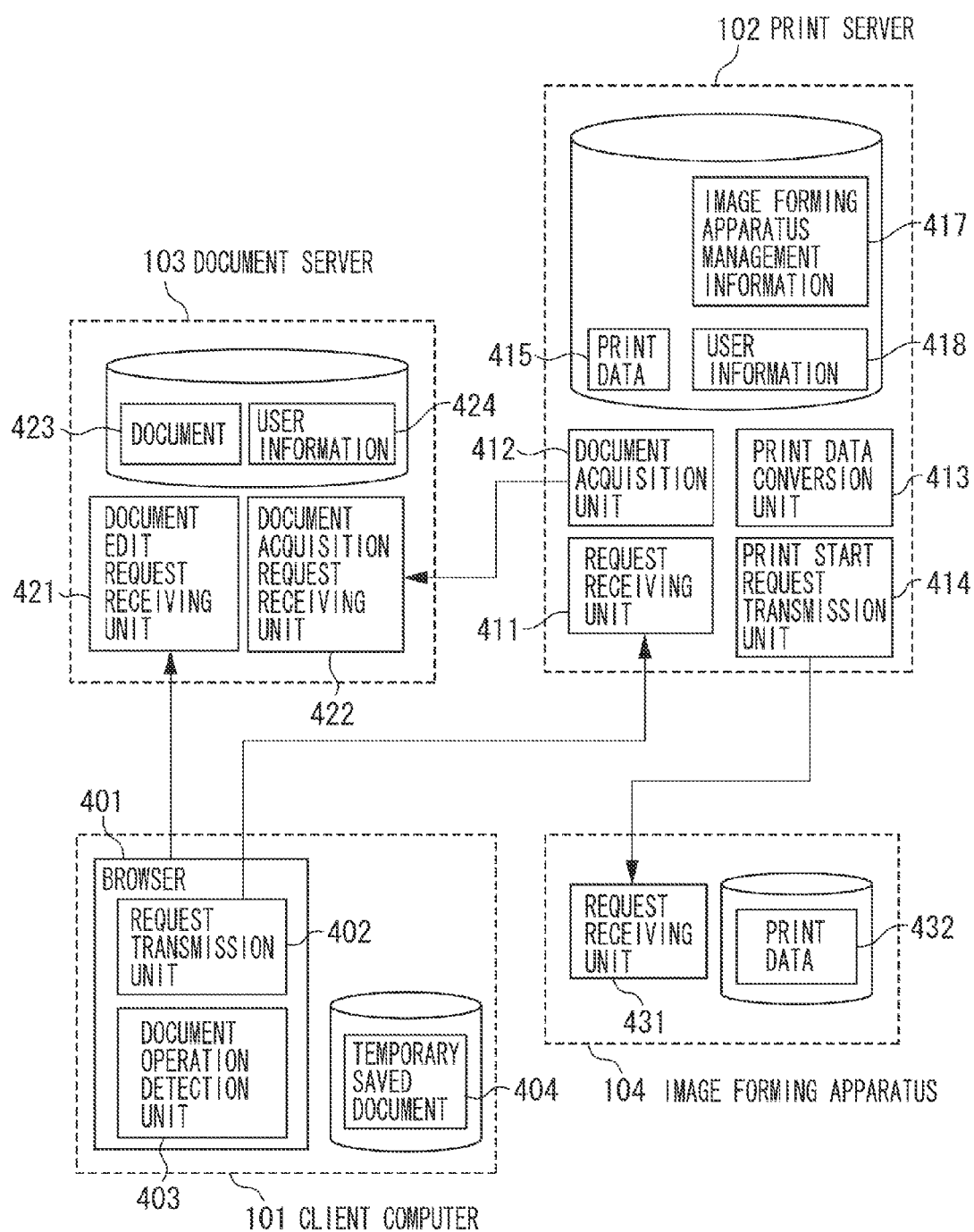
FIG. 4 illustrates an example of a functional configuration of the network print system.

Next, functions included in each apparatus of the network print system are described below. FIG. 4 illustrates an example of a functional configuration of the network print system.

First, functions included in the client computer 101 are described below. The client computer 101 includes a browser 401. The browser 401 fulfills functions of browsing and editing documents (what are called online documents) stored in the document server 103 via the network 100.

In the present exemplary embodiment, when editing a document stored in the document server 103, the client computer 101 stores a temporary saved document (temporary data) 404 corresponding to the document in the indirect storage unit 303. However, the apparatus can be configured such that the client computer 101 does not store the temporary saved document 404.

More specifically, in some document servers, when the client computer 101 edits a document of the document server 103 with the browser 401, the document server 103 immediately saves the document, so that the client computer 103 does not store the document. If the client computer 101 is a portable terminal, the indirect storage unit 303 has small capacity and cannot save a document of large capacity. Thus, the client computer 101 can be configured not to store the temporary saved document 404.

The browser 401 is configured to include a request transmission unit 402 and a document operation detection unit 403. According to the present exemplary embodiment, the request transmission unit 402 and the document operation detection unit 403 are implemented as plug-in software of the browser 401. The document operation detection unit 403 detects a user operation performed via an input device (i.e., detects what document of which document server 103 the user operation is performed on, and what operation is performed by the user).

A method for detecting a user operation by the document operation detection unit 403 is not limited to a specific one. The method for detecting a user operation is, e.g., a method for monitoring a uniform resource locator (URL) of the browser 401, a method for monitoring communication at a predetermined port, a method for referring to an internal setting file, a method for analyzing a notification from the document server 103, and a method for detecting a document operation event.

If the request transmission unit 402 determines that the contents of a document operation, which is an example of the user operation detected by the document operation detection unit 403, satisfy conversion conditions described below, the request transmission unit 402 transmits a print data conversion request to the print server 102. More specifically, the request transmission unit 402 transmits document saving location information (binary data representing thereof if a print data conversion request is made using the temporary saved document 404), document version information, and information concerning a user of the print server 102, together with the print data conversion request.

The request transmission unit 402 also transmits to the print server 102 a print request (in a broader sense, an output request) based on a print operation (in a broader sense, an output operation), which is an example of the user operation. More specifically, the request transmission unit 402 transmits to the print server 102 a print request together with the document saving location information, the document version information, the information concerning a user of the print server 102, a setting value set via a print setting screen, which is described below, and information concerning an image forming apparatus serving as a print destination.

In addition, the above described functions can be implemented by causing the CPU 301 to load a browser program, a document detection program, a request transmission program, and the like stored in the indirect storage unit 303 into the direct storage unit 302 and to execute the loaded programs. Methods for implementing the request transmission unit 402 and the document operation detection unit 403 are not limited to the plug-in software of the browser 401 and can be implemented by other methods.

Next, functions included in the print server 102 are described below. The print server 102 includes a request receiving unit 411, a document acquisition unit 412, a print data conversion unit 413, and a print start request transmission unit 414. Programs related to these components are stored in the indirect storage unit 303, loaded into the direct storage unit 302, and executed by the CPU 301.

The request receiving unit 411 receives a print data conversion request and a print request from the client computer 101. At that time, the request receiving unit 411 can perform user authentication using user information received from the client computer 101, and user information 418 stored in the indirect storage unit 303. When the print data conversion request is received, the document acquisition unit 412 transmits a document acquisition request to acquire a document to the document server 103 serving as a storage destination of the document designated by the client computer 101. When the document acquisition unit 412 transmits the document acquisition request, the print server 102 transmits to the document server 103 the document saving location information and information indicating that user authentication has already been performed.

Next, the print data conversion unit 413 converts the acquired document into print data and stores the converted print data in the indirect storage unit 303. According to the present exemplary embodiment, a document is converted into data of an intermediate file format which is used for outputting from the image forming apparatus. The intermediate file format is a file format that does not depend upon environment such as the model of the image forming apparatus and setting values. Examples of data of the intermediate file format are data of a portable document format (PDF), and extensible markup language (XML) paper specification (XPS) data.

More specifically, when the print server 102 receives an output request from the client computer 101, necessity of conversion processing of a part not depending upon environment can be eliminated by causing the print server 102 to preliminarily convert a document into print data of the intermediate file format. If outputting by the image forming apparatus is printing, data of the intermediate file format is sometimes referred to as print data.

On the other hand, if a print request is received by the request receiving unit 411, the print start request transmission unit 414 generates (or creates) print setting data according to information representing dependence on the model the image forming apparatus serving as a print destination designated by a user operation and a setting value designated by the user operation. The print setting data is transmitted to the image forming apparatus by being combined with print data or as it is, and used for performing a print process reflecting the model-dependent information and the setting value in the image forming apparatus. The print setting data is, e.g., a job definition format (JDF) or a job ticket.

After generating the print setting data, the print start request transmission unit 414 transmits the print setting data together with a print start request to the image forming apparatus by combining the print setting data with print data preliminarily stored in the indirect storage unit 303 or as they are. Instead of a configuration in which the print setting data is generated and combined with the print data, another configuration can be employed, in which the model-dependent information of the image forming apparatus and the setting value can be reflected in the print data by reconverting only a part of the print data that relates to the model-dependent information and the setting value which are preliminarily generated.

Instead of a configuration in which the print setting data is generated when a print request is received, another configuration can be employed, in which print setting data is preliminarily generated according to all setting value patterns and stored, and the print setting data corresponding to a designated setting value pattern is selected and used when a print request is received. This configuration is conceived by focusing on the fact that cost of memory capacity of the print server 102 is low according to cloud computing technology. According to this configuration, time taken to start printing can be reduced even when the print server 102 uses a large amount of memory capacity.

Next, functions included in the document server 103 are described below. The document server 103 includes a document edit request receiving unit 421 and a document acquisition request receiving unit 422. Programs corresponding these units are stored in the indirect storage unit 303, loaded into the direct storage unit 302, and executed by the CPU 301.

The document edit request receiving unit 421 receives requests for browsing, editing, and saving a document from the client computer 101. Then, the document edit request receiving unit 421 changes, in response to a user operation, a document 423 stored in the indirect storage unit 303. At that time, the document edit request receiving unit 421 can perform user authentication using user information 424.

The document acquisition request receiving unit 422 receives a document acquisition request transmitted from the print server 102, acquires the document 423 designated by the print server 102 from the indirect storage unit 303, and transmits the acquired document 423 to the print server 102. According to the present exemplary embodiment, a trust relationship is established between the document server 103 and the print server 102. Thus, the present exemplary embodiment has an authentication function (hereinafter referred to as a single sign-on function) which enables a user to access both of the servers once the user is authenticated by either of the servers.

Accordingly, when acquiring the document 423, the print server 102 transmits information indicating that the client computer 101 has been authenticated as a user, so that the client computer 101 can access the document server 103 using the single sign-on function. In other words, when making a request to the print server 102, the client computer 101 transmits only user information corresponding to the user information 418 and is not required to transmit user information corresponding to the user information 424.

In the present exemplary embodiment, the user information pieces are managed by the print server 102 and the document server 103, respectively. However, a method for managing user information is not limited to the above example. For example, another server computer for centrally managing the user information pieces stored in the two servers can be provided in the system. Alternatively, another system can be employed which is configured such that when each request is transmitted from the client computer 101, user information pieces stored in the two servers are transmitted from the client computer 101 without using the single sign-on function.

Next, the functions included in the image forming apparatus 104 are described below. The image forming apparatus 104 includes a request receiving unit 431. A program corresponding to the request receiving unit 431 is stored in the indirect storage unit 206. The program is loaded into the direct storage unit 205 and executed by the CPU 204. The request receiving unit 431 executes the print process when receiving a print start request form the print server 102.

Figure 5:
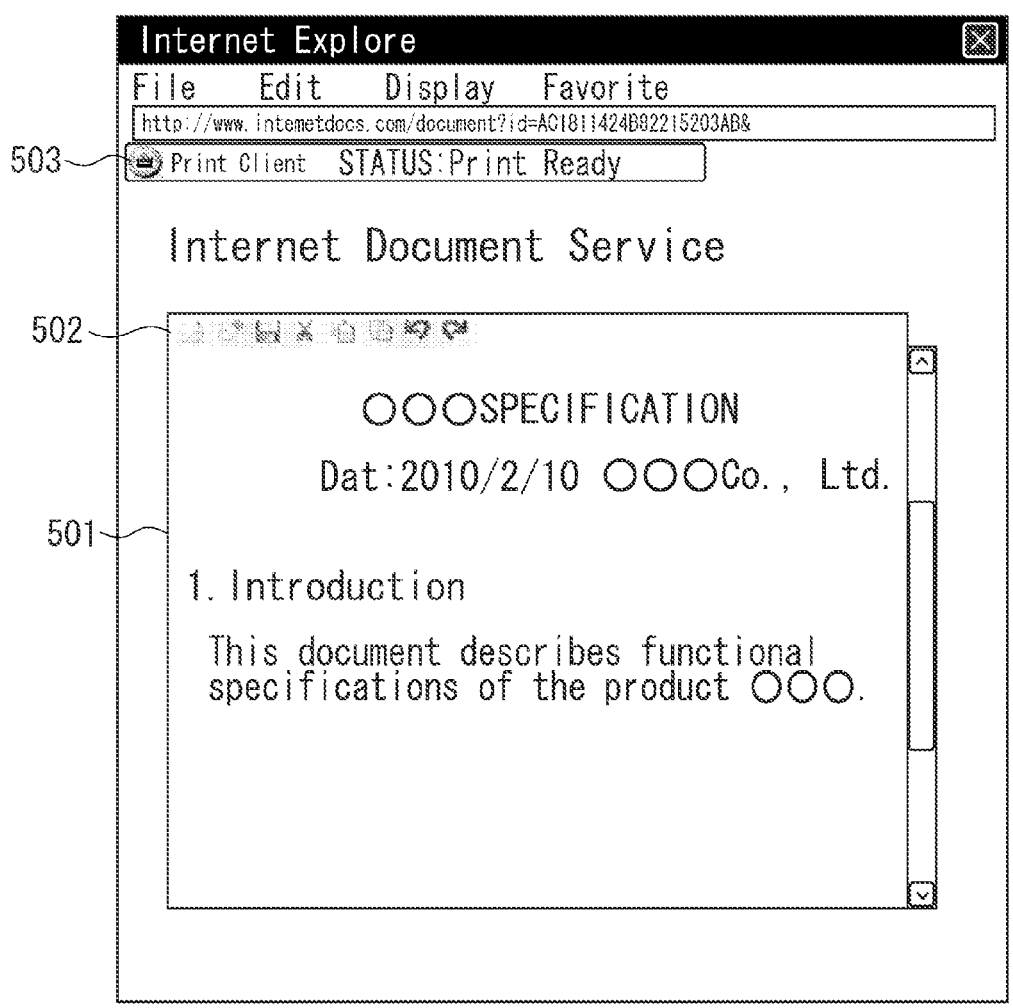
FIG. 5 illustrates an example of a document operation screen.

FIG. 5 illustrates an example of a screen (document operation screen) used when a document of the document server 103 is edited via the browser 401 of the client computer 101. Client software (print client) 503 is installed in the browser 401 as plug-in software for the browser 401. The document operation screen is displayed through displaying an authentication screen to the document server 103 and a document selection screen used to select a document in the document server 103, and the like.

A document editing portion 501 displays a document selected according to a user operation. In the present exemplary embodiment, a document is displayed in the document editing portion 501. However, a type of the document is not limited to a specific one. A document operation portion 502 receives a predetermined user operation corresponding to a document. The predetermined user operation is, e.g., generation of a new document, opening of a document, or saving of a document. However, the content of the operation is not limited thereto. For example, a user can update a document in the document server 103 by pressing a document saving button of the document operation portion 502 after editing the document displayed in the document editing portion 501 via an input device.

In the present exemplary embodiment, when a document is edited, the edited document is stored as the temporary saved document 404 in the indirect storage unit 303 of the client computer 101 until the document saving button is pressed. In the present exemplary embodiment, the document operation portion 502 is displayed in the form of a tool bar. However, the form of the document operation portion 502 is not limited thereto.

The client software 503 is configured to include the request transmission unit 402 and the document operation detection unit 403. The client software 503 transmits a print data conversion request and a print request to the print server 102. The client software 503 has a status display portion. A status of conversion of the print data of the document currently displayed in the document display portion 501 in the print server 102 is displayed in the status display portion. In the present exemplary embodiment, the client software 503 indicates one of the following three statuses, i.e., "Print Ready" status, "Translating" status, and "Not Ready" status.

The "Print Ready" status indicates a status in which a document has already been converted into print data by the print server 102. When printing is instructed (i.e., a print instruction is issued) in response to a user operation in this status, conversion of the document into the print data is unnecessary in the print server 102, so that time taken by the image forming apparatus to start printing is reduced.

The "Translating" status and the "Not Ready" status indicate a status in which a document is being converted by the print server 102, and a status in which a document is not yet converted by the print server 102, respectively. In these statuses, the conversion of the document into the print data is completed or started after the print instruction is issued. Therefore, as compared with the "Print Ready" status, time taken by the image forming apparatus to start printing is increased. Accordingly, the status display portion enables the following operation. That is, a user can perform another work until the status of the print server 102 is changed to the "Print Ready" status. Then, the user can issue a print instruction after the status is turned into the "Print Ready" status. Consequently, wait time for start of printing can be reduced, so that the work can efficiently be performed.

Figure 6:
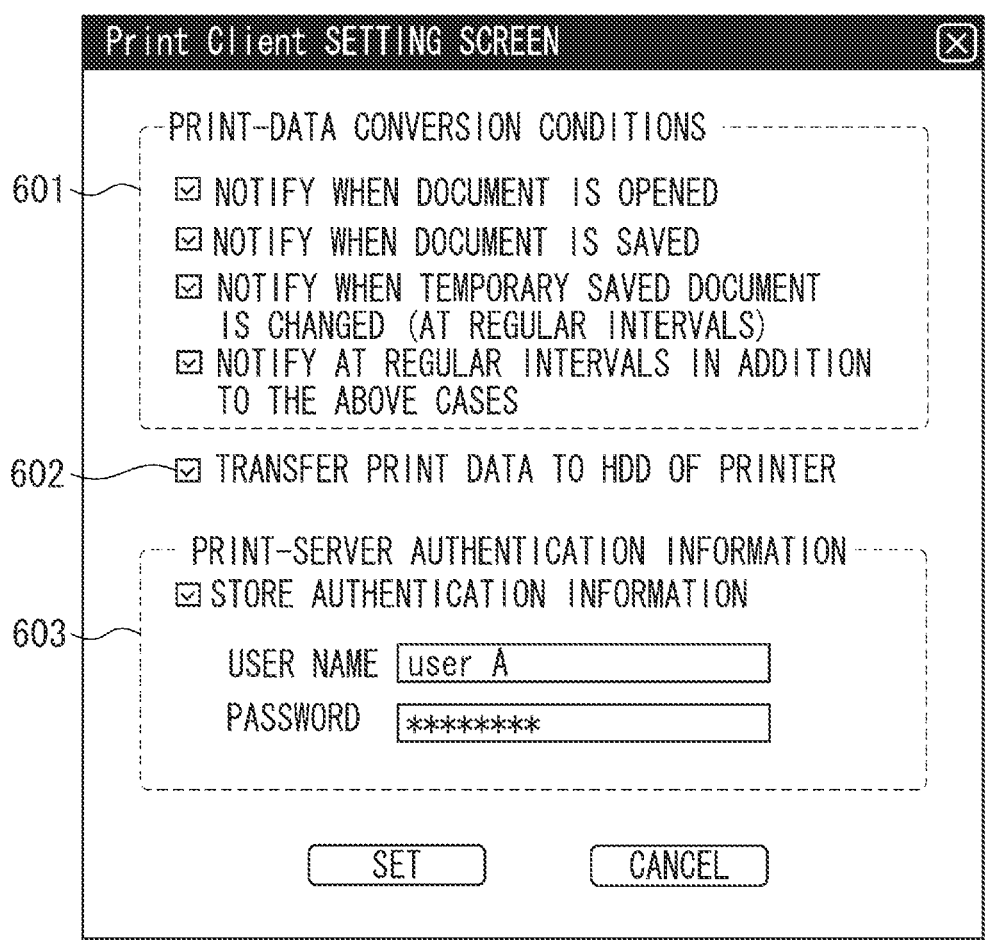
FIG. 6 illustrates an example of a setting screen.

FIG. 6 illustrates an example of a setting screen for performing setting concerning the client software 503. The setting screen is displayed by being triggered by pressing a setting menu (corresponding to a client software setting portion 702 which will be described below) of the client software 503.

A conversion condition setting portion 601 in FIG. 6 receives setting for the conditions of the print data conversion request to be transmitted to the print server 102. According to the present exemplary embodiment, one of the following four conditions can be select in response to a user operation. The conditions include "notify when the document is opened", "notify when the document is saved", "notify when the temporary saved data is changed, (at regular intervals)", and "notify at regular intervals in addition to the above cases".

If the condition "notify when the document is opened" is selected, when the document operation detection unit 403 detects that the document of the document server 103 is opened, the request transmission unit 402 transmits the print data conversion request to the print server 102. If the condition "notify when the document is saved" is selected, when the document operation detection unit 403 detects that the document of the document server 103 is saved, the request transmission unit 402 transmits the print data conversion request to the print server 102.

Most frequent use cases of printing are to print a document immediately after a user opens the document, or to print a document after the document is edited and saved. Thus, the print data conversion request can be transmitted based on a general use case by setting such a case to be selectable.

If the condition "notify when the temporary saved data is changed (at regular interval)" is selected, when the document operation detection unit 403 detects the change of the temporary saved document 404, the request transmission unit 402 transmits the print data conversion request to the print server 102. This processing is employed by considering a case where a print instruction is issued during editing the document of the document server 103 without pressing the saving button of the document operation unit 502.

In this case, the system is in a state in which the temporary saved document 404 is newer than the document of the document server 103, until the saving button is pressed. Thus, the selection of this condition enables that the print data can be converted by the print server 102 in advance in the above case. However, the conversion of the temporary saved document 404 is very frequently performed. Thus, if the print data conversion request is transmitted every time this status is detected, a large number of print data conversion requests are expected to be handled in the network 100. Accordingly, the system can be configured such that no print data conversion requests are transmitted at certain intervals (each of which is, e.g., 10 minutes).

If the condition "notify at regular intervals in addition to the above cases" is selected, the request transmission unit 402 transmits the print data conversion request corresponding to the currently browsed document at the regular intervals (e.g., 10 minutes) even in the case other than the above three cases. This processing is employed by considering, for example, a case where a document shared by a plurality of users is updated by another user. The condition (i.e., conversion condition) designated by the conversion condition setting portion 601 is not limited to the above four conditions and can be customized according to the use case.

A transfer setting portion 602 receives a designation indicating whether, when a document is converted into print data by the print server 102, to transmit the converted print data to an image forming apparatus that the user can use in advance. The print server 102 determines the image forming apparatus that the user can use based on image forming apparatus management information 417. The image forming apparatus management information 417 includes information associated with the user and the available image forming apparatus. However, the image forming apparatus management information 417 is not limited thereto. For example, the image forming apparatus management information 417 can be further associated with a current state of the image forming apparatus.

Thus, time taken to start printing can be more reduced by transferring the print data to the image forming apparatus in advance. The system can be configured such that the print setting data frequently used by a user is combined with the print data and the combined data may be transferred to the image forming apparatus, instead of transferring only the print data to the image forming apparatus.

An authentication information setting portion 603 receives designation of user information representing a user authenticated by the print server 102. However, a method for designating the user information is not limited thereto. For example, the system can be configured such that the user information can be designated with a pop-up dialog when the print data conversion request is transmitted. Alternatively, the system can be configured such that the user information can be designated using a file of a certification or the like.

Figure 7:
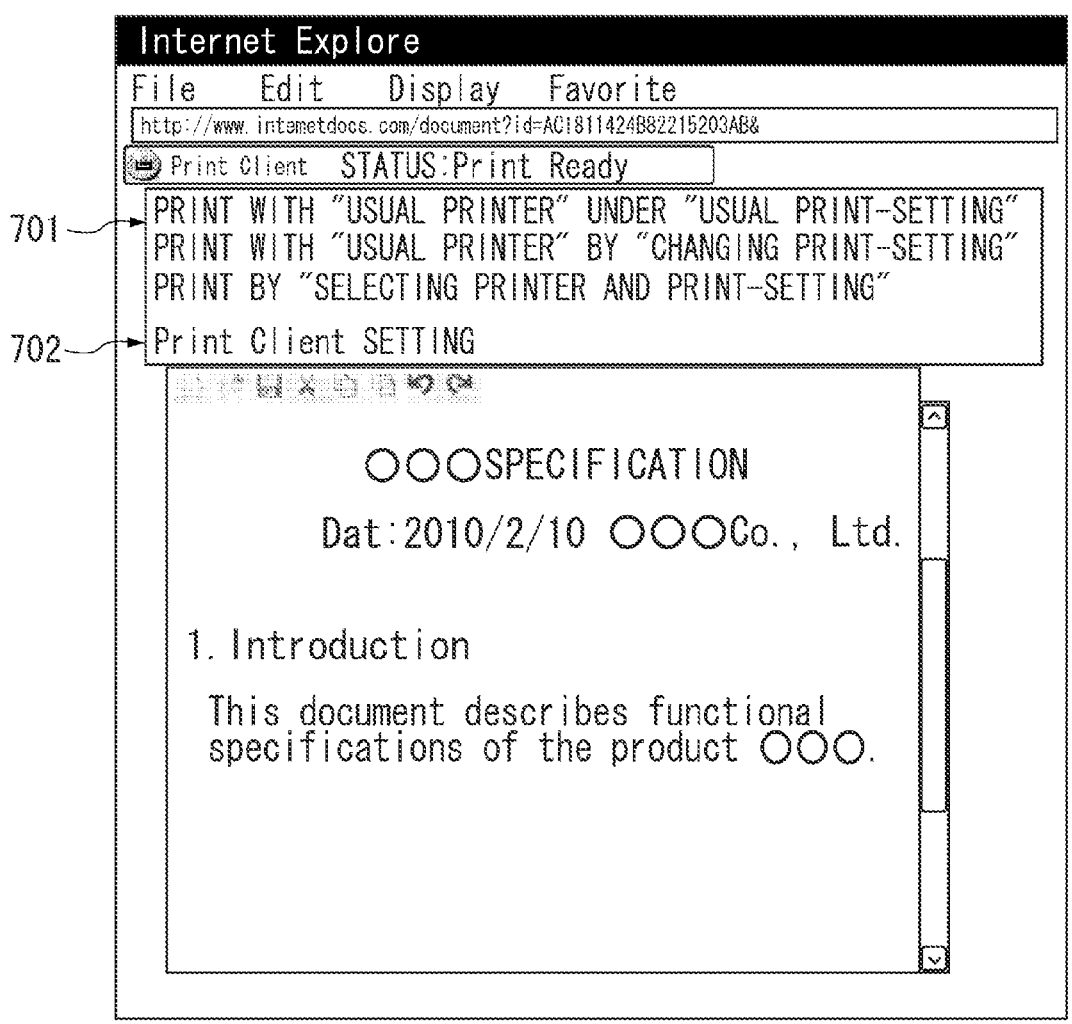
FIG. 7 illustrates an example of a print instruction screen.

FIG. 7 illustrates an example of a screen (print instruction screen) used when a print instruction is issued. According to the present exemplary embodiment, when one of items in a print request designation portion 701 is selected from a pull-down menu displayed by pressing the client software 503, a print request is transmitted to the print server 102.

A print request designation portion 701 has a menu of the following options, i.e., "print with a 'usual printer' under 'usual print-setting'", "print with a 'usual printer' by 'changing print-setting'", and "print by 'selecting a printer and print-setting'".

If the option "print with a 'usual printer' under 'usual print-setting'" is selected, the request transmission unit 402 transmits the print request to the print server 102 without displaying the print setting screen for selecting an image forming apparatus and for performing print-setting. If the document is not changed, and the print data and the print setting data have been transferred to the image forming apparatus, the print server 102 does not transmit the print data and the print setting data when the print instruction is issued. Thus, time taken to start printing is more reduced.

If the option "print with a 'usual printer' by 'changing print-setting'" is selected, the request transmission unit 402 displays the print setting screen and transmits the print request to the print server 102 after a setting value is designated in response to a user operation. If the print data and the print setting data have been transferred to the image forming apparatus, the print server 102 transmits the print setting data to the image forming apparatus when the setting value is changed at issuance of the print instruction.

If the option "print by 'selecting a printer and print-setting'" is selected, the request transmission unit 402 displays the print setting screen and transmits the print request to the print server 102 after the selection of the image forming apparatus and the designation of the setting value are performed.

The system can be configured such that the print data and the print setting data are transferred to the image forming apparatus usually used by the user. At that time, the print server 102 transmits the print data and the print setting data to the image forming apparatus instructed to perform printing, if the image forming apparatus instructed to perform printing differs from the image forming apparatus to which the print data is preliminarily transferred.

The client software setting portion 702 displays a setting screen (i.e., the screen illustrated in FIG. 6) for performing setting concerning the client software 503.

Figure 8:
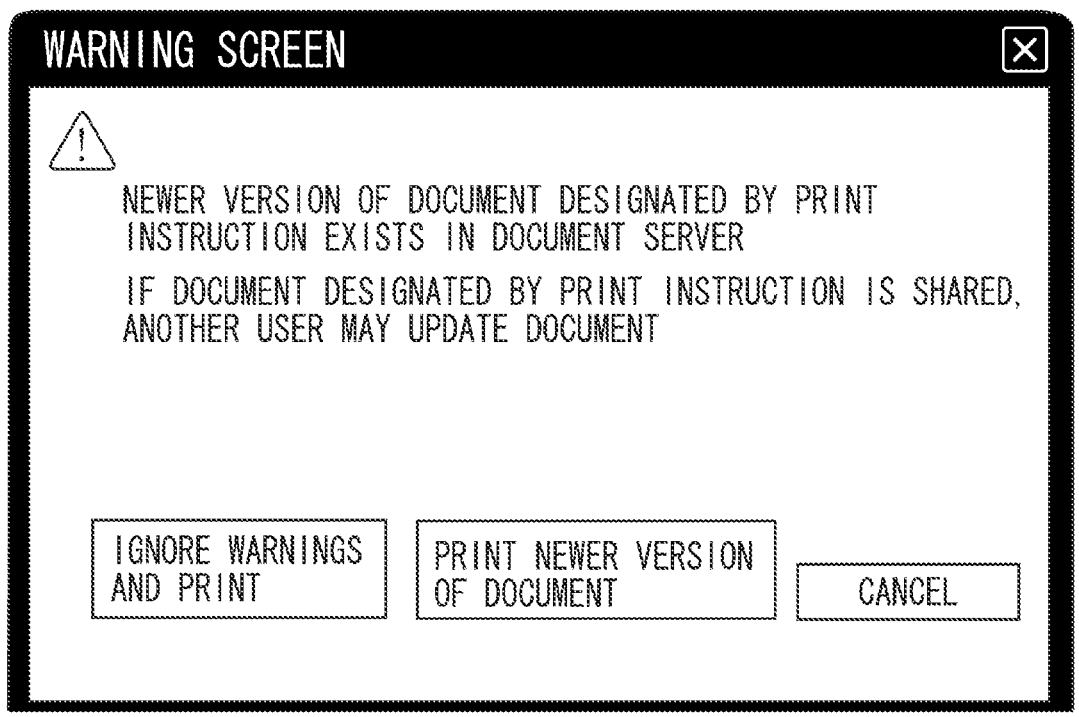
FIG. 8 illustrates an example of a warning screen.

FIG. 8 illustrates an example of a warning screen that can be displayed in the client computer 101 when a print instruction is issued. The warning screen is displayed if a document which is indicated by an update history to be newer than a document currently browsed by a user is stored in the document server 103 when the document instructed to be printed is acquired from the document server 103 by the print server 102. This situation can occur if a single document is edited by a plurality of users. When the warning screen is displayed, a user can select one of the following options, i.e., "ignore warnings and print", "print a newer version of the document", and "cancel" via the input device.

FIG. 9 illustrates an example of a data structure of print management information stored in the indirect storage unit 303 of the print server 102. The print management information is configured to include the following pieces of information, i.e., a document identifier 901, a document saving location 902, a document version 903, a conversion date and time 904, print data 905, a transfer destination printer 906, and a requesting-user 907.

The document identifier 901 is an identifier for uniquely identifying a document of the document server 103. The document saving location 902 indicates the saving location (storage location) of a document transmitted together with a print data conversion request from the client computer 101. In this example, the saving location of the data represented by the document identifier 901 of "zzzzzzz" is "local". This indicates that the temporary saved document (binary data) 404 is transmitted from the client computer 101 together with the print data conversion request.

The document version 903 indicates the version of the document transmitted from the client computer 101 together with the print data conversion request. When receiving the print request, the print server 102 compares the document version 903 with the version of the document transmitted from the client computer 101, and determines whether the document has already been converted into print data. The conversion date and time 904 indicates a date and time at which the document is converted into the print data in the print server 102. For example, the system can be configured such that print data, whose conversion date and time is old, is periodically deleted.

The print data 905 indicates the print data converted by the print server 102. The print server 102 identifies a user based on the user information transmitted together with the print data conversion request, determines the image forming apparatus that the user can use according to the image forming apparatus management information 417, and converts the document into the executable print data in the image forming apparatus determined to be available. At that time, if the print server 102 determines that there is a plurality of image forming apparatuses that the user can use and the image forming apparatuses differ from one another in the executable print data, the print server 102 converts the document into print data in the executable format corresponding to each image forming apparatus.

The transfer destination printer 906 indicates, when the transfer setting portion 602 instructs the transfer of the print data to an image forming apparatus, the image forming apparatus to which the print data is transferred. When receiving the print request, the print server 102 compares information representing the image forming apparatus which is stored in the transfer destination printer 906 with information representing the image forming apparatus serving as a print destination which is transmitted from the client computer 101 together with the print request. Thus, the print server 102 determines whether the print data has been transmitted.

The requesting-user 907 indicates the user information transmitted from the client computer 101 together with the print data conversion request. The components of the data structure of the print management information are not limited to those items. For example, in a configuration in which not only print data but also print setting data are generated when a print data conversion request is transmitted, the print management information includes the generated print setting data.

Figure 10:
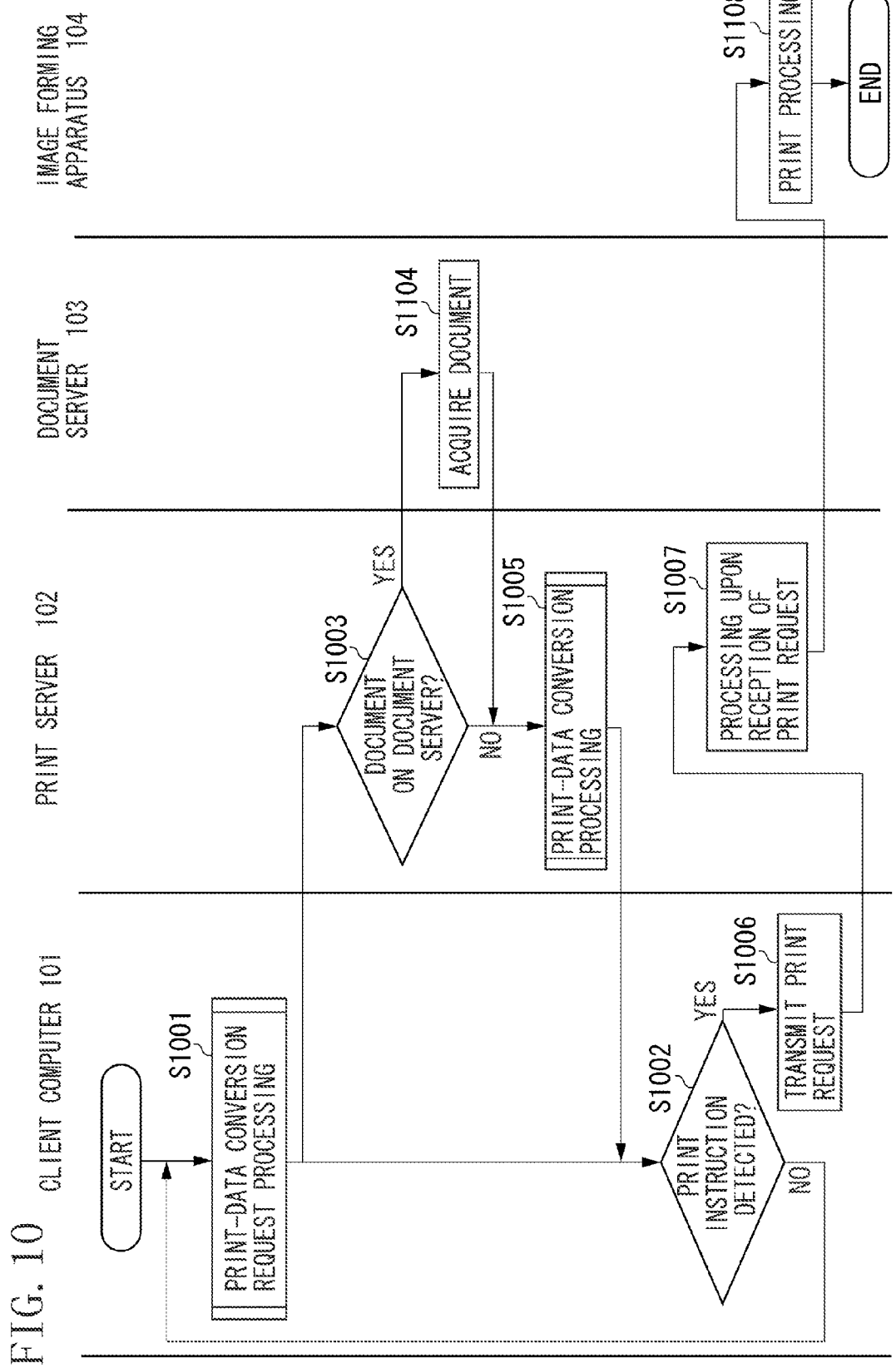
FIG. 10 illustrates an example of a flowchart of processing performed in the entire network print system.

FIG. 10 illustrates an example of a flowchart of a process performed in the entire network print system.

In step S1001, the client computer 101 performs print data conversion request processing. This processing is described in detail with reference to FIG. 11. At that time, the client computer 101 transmits, if it is determined that a print data conversion request is transmitted, a print data conversion request to the print server 102. Then, processing in step S1003 is performed. On the other hand, if it is determined that the transmission of the print data conversion request is unnecessary, the client computer 1001 performs the processing in step S1002.

In step S1103, when receiving the print data conversion request from the client computer 101, the print server 102 determines whether a document whose conversion into print data is requested is that on the document server 103.

If the print server 102 determines that the document whose conversion into print data is requested is that on the document server 103 (Yes in step S1003), the print server 102 transmits a document acquisition request to the document server 103. Then, processing in step S1004 is performed. In the processing in step S1004, the document server 103 acquires the document based on the saving location information included in the document acquisition request. Then, the document server 103 transmits the acquired document to the print server 102. Then, processing in step S1005 is performed.

On the other hand, if the print server 102 determines that the document whose conversion into print data is requested is not that on the document server 103 (No in step S1003), processing in step S1005 is performed, because the document (temporary saved document) is transmitted together with the print data conversion request. In step S1005, the print server 102 performs print data conversion processing. This processing is described in detail with reference to FIG. 12.

In step S1002, if the client computer 101 determines that a print instruction is detected (Yes in step S1002), then in step S1006, the client computer 101 transmits a print request to the print server 102. On the other hand, if the client computer 101 determines that the print instruction is detected (No in step S1002), the processing in step S1001 is performed again. When the print server 102 receives the print request from the client computer 101, in step S1007, the print server 102 performs the processing upon reception of the print request. This processing is described in detail with reference to FIG. 13.

When receiving a print start request from the print server 102, in step S1008, the image forming apparatus 104 performs print processing. This processing is described in detail with reference to FIG. 14.

Figure 11:
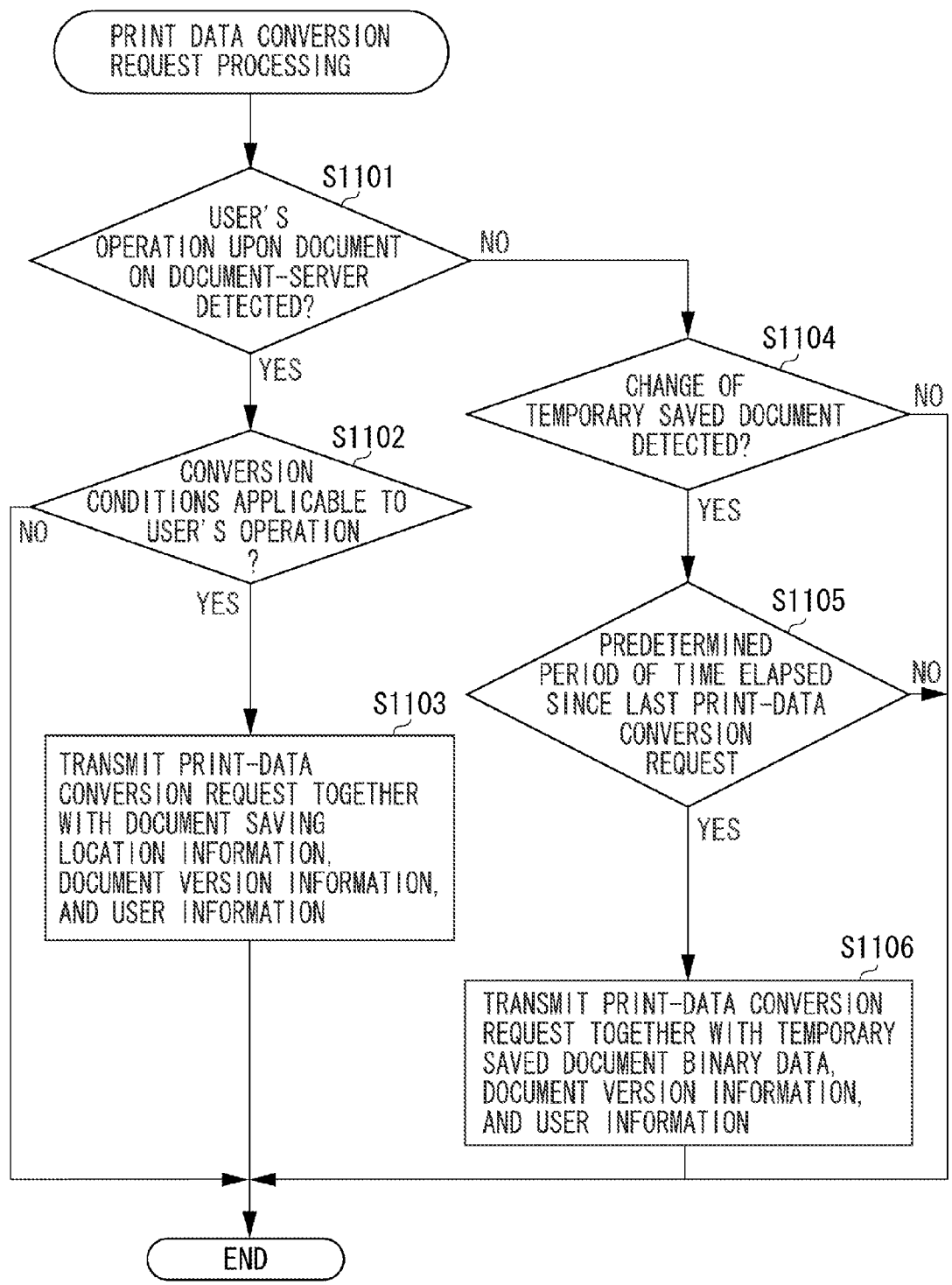
FIG. 11 illustrates an example of a flowchart of a print data conversion request process.

FIG. 11 illustrates an example of a flowchart of the print data conversion request processing performed in the client computer 101.

First, in step S1101, the document operation detection unit 403 determines whether a user operation performed on the document on the document server 103 is detected. At that time, if the document operation detection unit 403 determines that a user operation performed on the document on the document server 103 is detected (Yes in step S1101), processing in step S1102 is performed. On the other hand, if the document operation detection unit 403 determines that a user operation performed on the document on the document server 103 is not detected (No in step S1101), processing in step S1104 is performed.

In step S1102, the request transmission unit 402 determines whether the contents of the detected user operation satisfy the conversion conditions. At that time, if the request transmission unit 402 determines that the contents of the detected user operation satisfy the conversion conditions (Yes in step S1102), in step S1103, the request transmission unit 402 transmits the print data conversion request to the print server 102. More specifically, when transmitting the print data conversion request, the request transmission unit 402 transmits the saving location information of the document detected by the document operation detection unit 403, the document version information, and the user information set in the authentication information setting portion 603. On the other hand, if the request transmission unit 402 determines that the contents of the detected user operation do not satisfy the conversion conditions (No in step S1102), the request transmission unit 402 terminates the processing in the flowchart.

In step S1104, the document operation detection unit 403 determines whether a change of the temporary saved document 404 in the client computer 101 is detected. At that time, if the document operation detection unit 403 determines that that the change of the temporary saved document 404 is detected (Yes in step S1104), the request transmission unit 402 performs the processing in step S1105. On the other hand, if the document operation detection unit 403 determines that that the change of the temporary saved document 404 is not detected (No in step S1104), the document operation detection unit 403 terminates the processing.

In step S1105, the request transmission unit 402 determines whether a predetermined time has elapsed since the transmission of the last print data conversion request. At that time, if the request transmission unit 402 determines that the predetermined time has elapsed (Yes in step S1105), in step S1106, the request transmission unit 402 transmits the print data conversion request to the print server 102. Then, the request transmission unit 402 terminates the processing. More specifically, when transmitting the print data conversion request, the request transmission unit 402 transmits the temporary saved document (binary data) 404, the document version information, and the user information set in the authentication information setting portion 603. On the other hand, if the request transmission unit 402 determines that the predetermined time has not elapsed (No in step S1105), the request transmission unit 402 terminates the processing.

In a configuration in which the temporary saved document 404 is not saved in the client computer 101, the print data conversion request processing is such that steps S1104 through S1106 are omitted from the process flowchart illustrated in FIG. 11.

In another configuration, the client computer 101 determines, in the print data conversion request process, whether the document server 103 is a server configured to store the temporary saved document 404, and then determines whether to perform the processing in steps S1104 through S1106.

Alternatively, the document server 103 determines whether the client computer 101 is a portable terminal or the like and can store the temporary saved document 404, and then determines whether to perform the processing in steps S1104 through S1106.

Figure 12:
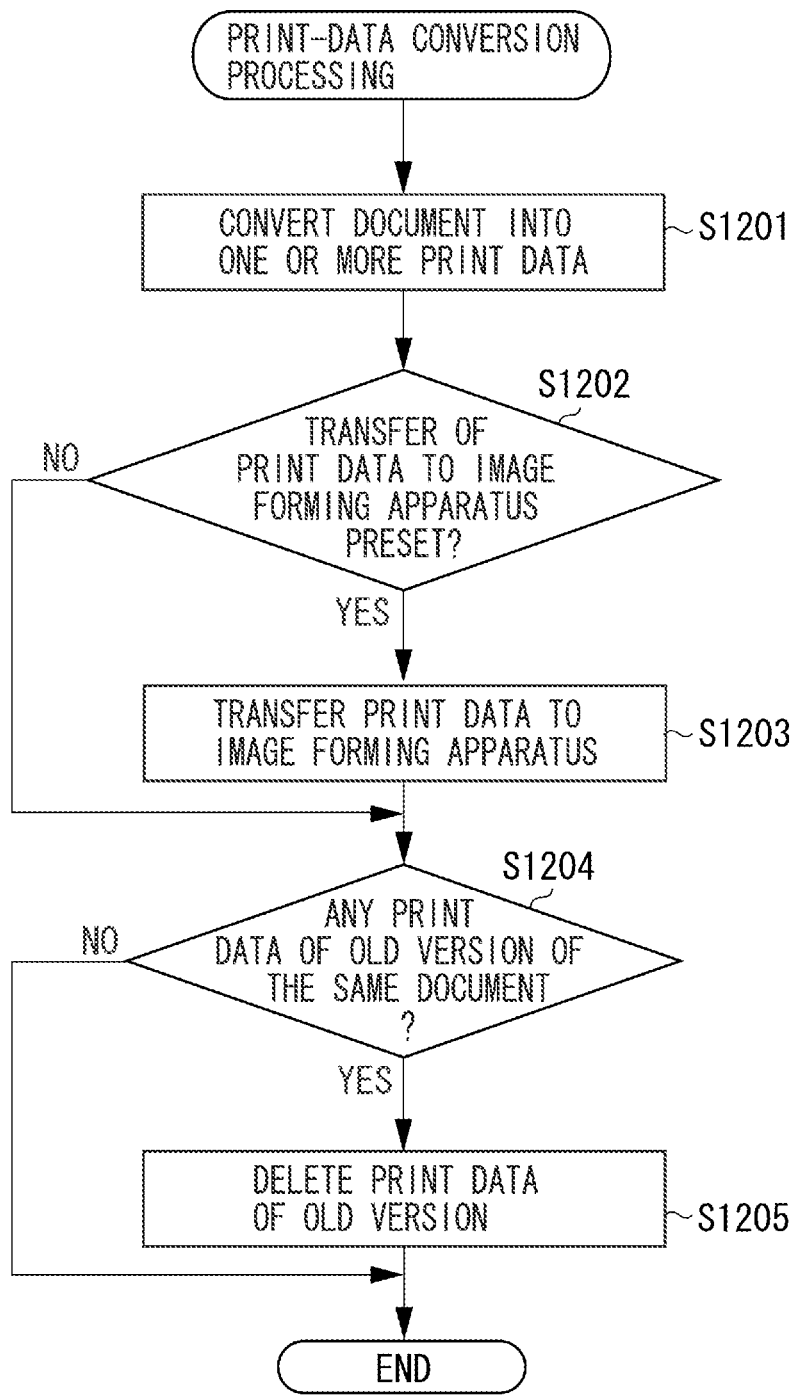
FIG. 12 illustrates an example of a flowchart of the print data conversion request process.

FIG. 12 illustrates an example of a flowchart of the print data conversion processing performed in the print server 102.

First, the print data conversion unit 413 determines the image forming apparatus that can be used by the user based on the user information received from the client computer 101 and the image forming apparatus management information 417. Then, in step S1201, the print data conversion unit 413 determines an intermediate file format executable in the determined image forming apparatus, and converts the document into data (print data) of the intermediate file format executable in the image forming apparatus.

At that time, if the print data conversion unit 413 determines that there is a plurality of intermediate file formats executable in the image forming apparatus, the print data conversion unit 413 converts the document into data respectively having all of the intermediate file formats. At that time, information representing the image forming apparatus frequently used by the user can be stored by being included in the user information 418. In addition, the print data conversion unit 413 can convert the document into print data preferentially from the intermediate file format executable in the image forming apparatus frequently used by the user.

Then, in step S1202, the print data conversion unit 413 determines whether the transfer is set on the transfer setting portion 602. If the print data conversion unit 413 determines that the transfer is set (Yes in step S1202), in step S1203, the converted print data is transferred to the corresponding image forming apparatus. At that time, information concerning the setting of the transfer to the image forming apparatus can be received by the print data conversion unit 413 from the client computer 101 when the print data conversion request is transmitted. Alternatively, the information concerning the setting of the transfer to the image forming apparatus can be received by the print data conversion unit 413 when such information is set in the transfer setting portion 602. In addition, the contents of the setting can be stored in the indirect storage unit 303 of the print server 102. On the other hand, if the print data conversion unit 413 determines that the transfer is not set (NO in step S1202), the print data conversion unit 413 performs the processing in step S1204.

In step S1204, the print data conversion unit 413 determines whether print data of an older version of the same document is stored in the indirect storage unit 303 using the print management information. At that time, if the print data conversion unit 413 determines that the print data of the older version of the same document is stored in the indirect storage unit 303 (Yes in step S1204), in step S1205, the print data conversion unit 413 deletes the print data (in a broader sense, the relevant print management information) of the older document version 903 from the indirect storage unit 303. Then, the print data conversion unit 413 terminates the processing. On the other hand, if the print data conversion unit 413 determines that print data of the older version of the same document is not stored in the indirect storage unit 303 (No in step S1204), the print data conversion unit 413 terminates the processing.

Figure 13:
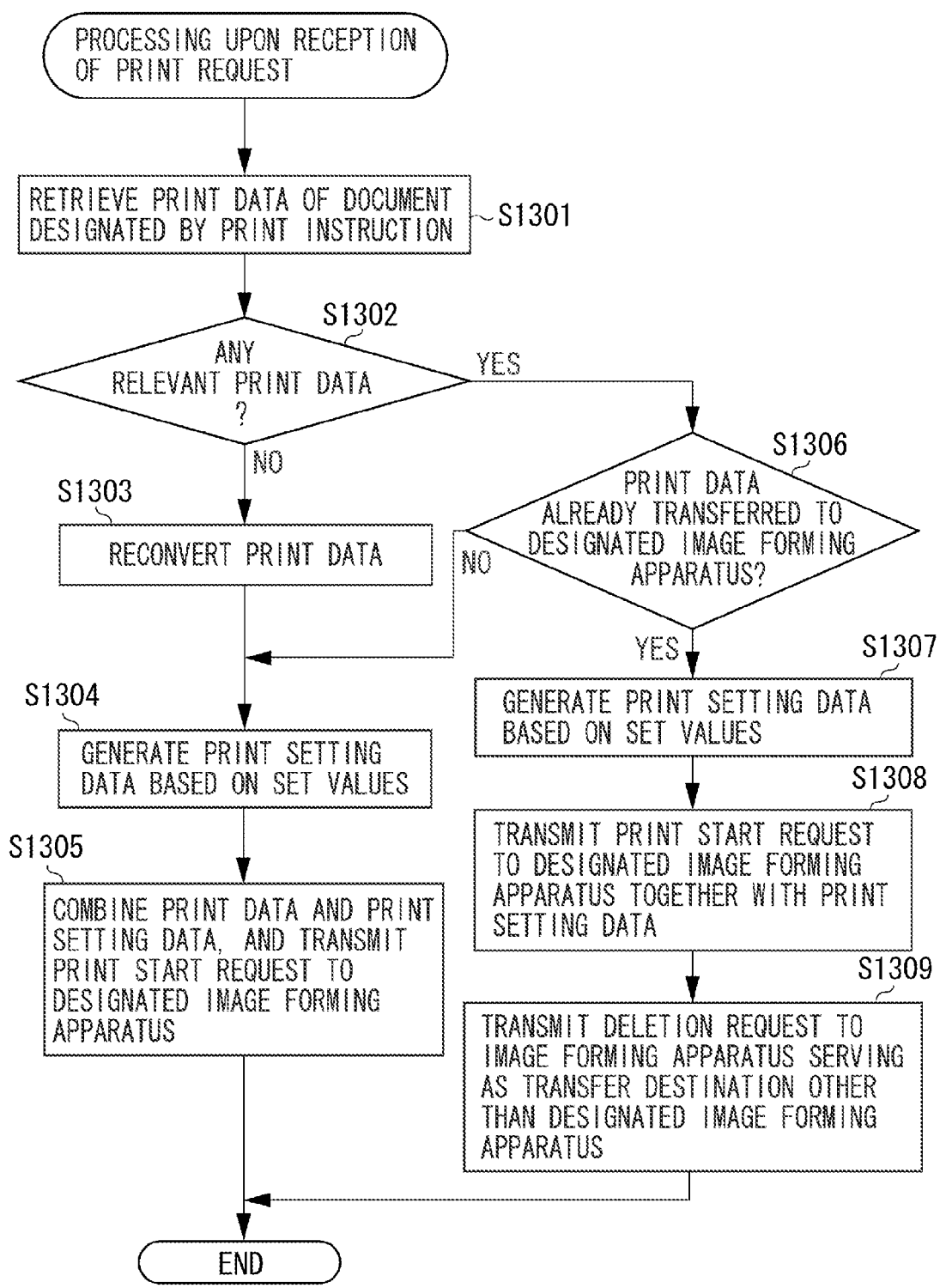
FIG. 13 illustrates an example of a flowchart of a process upon reception of a print request.

FIG. 13 illustrates an example of a flowchart of the processing upon reception of the print request, which is performed by the print server 102.

First, in step S1301, the request receiving unit 411 retrieves the print data in which the version of the document corresponding to the print request matches with the document version 903 thereof using the print management information. In step S1302, if the request receiving unit 411 determines that no relevant print data is present (No in step S1302), in step S1303, the print data conversion unit 413 converts the document into print data. Then, the request receiving unit 411 performs the processing in step S1304. The document used for the conversion is acquired from the document server 103, based on the saving location information received together with the print request.

On the other hand, if the request receiving unit 411 determines that the relevant print data is present (Yes in step S1302), the request receiving unit 411 performs the processing in step S1306.

In step S1306, the request receiving unit 411 determines, using the print management information, whether the print data has already been transferred to the image forming apparatus. At that time, if the request receiving unit 411 determines that the print data has already been transferred (Yes in step S1306), the processing in step S1307 is performed. If the request receiving unit 411 determines that the print data has not already been transferred (No in step S1306), the processing in step S1304 is performed.

In step S1304, the print data conversion unit 413 generates the print setting data from the setting value received together with the print request and information concerning the image forming apparatus serving as the print destination. Then, in step S1305, the print start request transmission unit 414 combines the print data and the print setting data and transmits the combined data together with the print start request to the image forming apparatus specified by the information concerning the image forming apparatus serving as the print destination. Then, the processing is terminated.

In step S1307, the print data conversion unit 413 generates the print setting data from the setting value received together with the print request and information concerning the image forming apparatus serving as the print destination.

Then, in step S1308, the print start request transmission unit 414 transmits the print start request together with the generated print setting data to the image forming apparatus specified by the information concerning the image forming apparatus serving as the print destination. In other words, the print start request transmission unit 414 requests printing by transmitting only the print setting data to the designated image forming apparatus without transmitting the print data.

In step S1309, if it is determined, using the print management information, that the print data has been transferred to the image forming apparatus other than the image forming apparatus serving as the print destination, a print data deletion request unit (not shown) transmits a transferred print data deletion request to the relevant image forming apparatus.

The capacity of the indirect storage unit 303 of the print server 102 is very large. Thus, it does not matter to store in the storage unit 303 print data having low probability of being used. However, the capacity of the indirect storage unit 206 of the image forming apparatus 104 is small, as compared with that of the print server 102. In view of such circumstances, the system employs the above configuration. With this configuration, print data having low probability of being used can appropriately be deleted.

Figure 14:
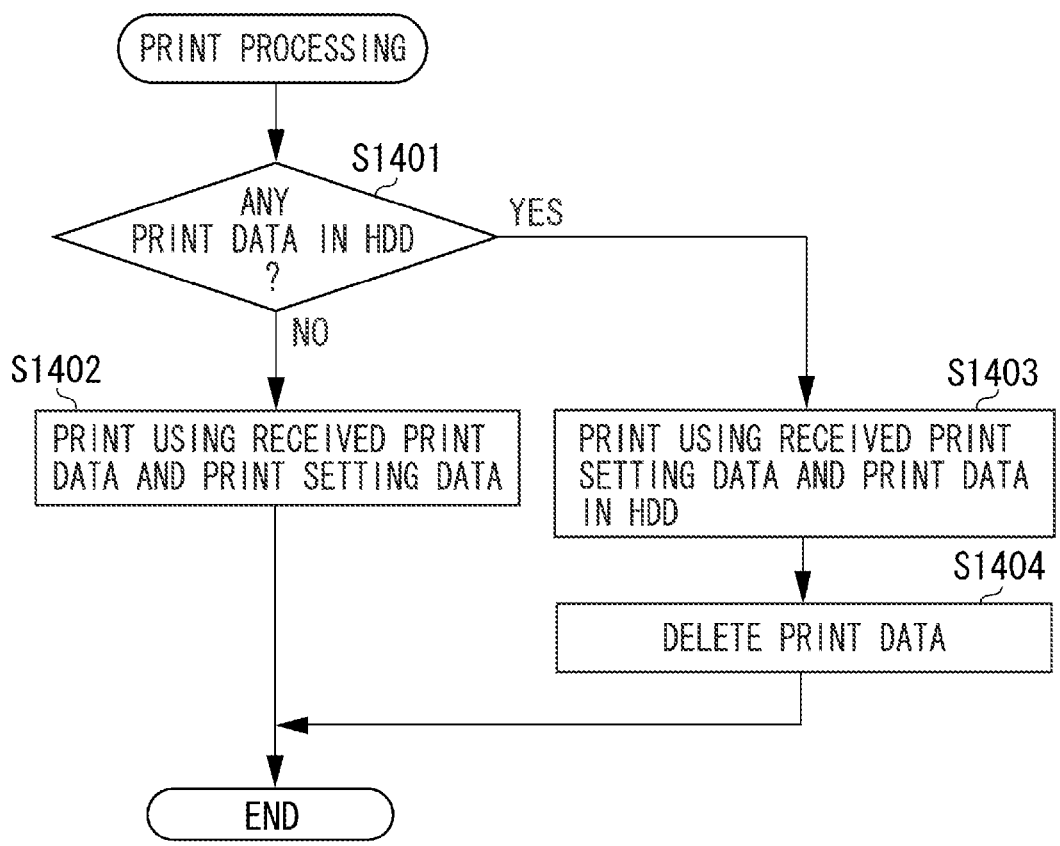
FIG. 14 illustrates an example of a flowchart of a print process.

FIG. 14 illustrates an example of a flowchart of the print processing performed in the image processing apparatus 104.

First, in step S1401, when receiving the print start request, the request receiving unit 431 checks whether print data exists in the indirect storage unit 206. At that time, if the request receiving unit 431 determines that no print data exists in the indirect storage unit 206 (No in step S1401), the request receiving unit 431 performs the processing in step S1402. On the other hand, if the request receiving unit 431 determines that print data exists therein (Yes in step S1401), the request receiving unit 431 performs the processing in step S1403.

In step S1402, the request receiving unit 431 executes printing using the print data and the print setting data received together with the print start request. In step S1403, the request receiving unit 431 executes printing using the print setting data received together with the print start request, and the print data stored in the indirect storage unit 206.

Upon completion of printing, in step S1404, the request receiving unit 431 deletes the print data from the indirect storage unit 206. The capacity of the indirect storage unit 206 of the image forming apparatus 104 is not large. With this configuration, print data having low probability of being used can appropriately be deleted.

In the configuration according to the first exemplary embodiment, the client computer 101 edits a document of the document server 103. However, in a configuration according to a second exemplary embodiment, the client computer 101 edits a document (what is called an offline document) stored in itself. In the present exemplary embodiment, description of components which are the same as those in the first exemplary embodiment may be omitted.

Figure 15:
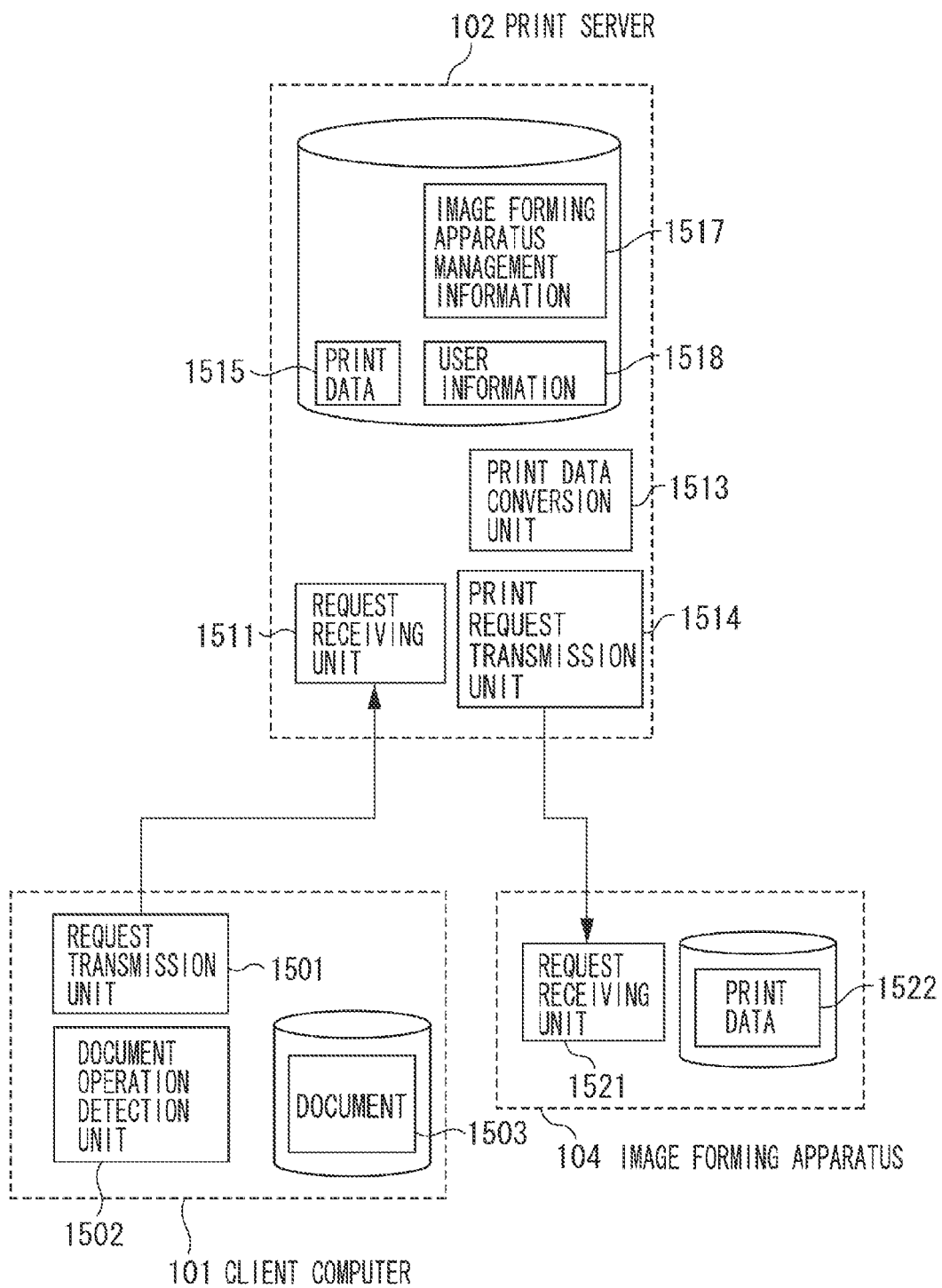
FIG. 15 illustrates an example of a functional configuration of the network print system.

FIG. 15 illustrates an example of a functional configuration of a network print system according to the second exemplary embodiment. In the present exemplary embodiment, the document server 103 is not included in the system. Documents 1503 stored in the indirect storage unit 303 of the client computer 101 are browsed and edited.

First, functions included in the client computer 101 are described below. According to the present exemplary embodiment, the documents 1503 of the client computer 101 are browsed and edited in response to user operations. A document operation detection unit 1502 detects what document in the indirect storage unit 303 of the client computer 101 the user operation is performed on, and what operation is performed.

If a request transmission unit 1501 determines that contents of a document operation detected by the document operation detection unit 1502 satisfy the conversion conditions, the request transmission unit 1501 transmits a print data conversion request to the print server 102. The conversion conditions are substantially the same as those set in the conversion condition setting portion 601. However, the option "notify when the temporary saved data is changed" is unnecessary in the present exemplary embodiment.

When transmitting the print data conversion request, the client computer 101 also transmits the document (binary data) 1503, the document version information, and the user information corresponding to the print server 102. When a print instruction is issued, the request transmission unit 1501 transmits to the print server 102 a print request together with the document 1503, the document version information, the user information corresponding to the print server 102, the setting value, and information concerning an image forming apparatus serving as a print destination.

The above described functions are implemented by loading the document operation detection program and the request transmission program into the direct storage unit 302 and executing the loaded programs by the CPU 301. According to the present exemplary embodiment, the request transmission unit 1501 and the document operation detection unit 1502 can be implemented as resident applications or services, instead of the plug-in software for the browser. However, the request transmission unit 1501 and the document operation detection unit 1502 can be implemented by other forms.

Next, functions included in the print server 102 are described below. The print server 102 does not need to include the document acquisition unit 412 illustrated in FIG. 4. The other functions of the print server 102 are similar to those described with reference to FIG. 4. A request receiving unit 1511 receives a document (binary data) when receiving a print data conversion request, and when receiving a print request. The subsequent processing performed by the request receiving unit 1511 is similar to that performed when the temporary received document 404 is received.

According to the present exemplary embodiment, if the document 1503 in the client computer 101 is operated, time taken to start printing can be more reduced. In addition, the time taken to start printing can be more reduced by appropriately combining the configuration of the first exemplary embodiment and that of the second exemplary embodiment.

With the configuration of the above exemplary embodiments, time taken to start outputting from the image forming apparatus the document data currently operated can be more reduced.

Aspects can also be realized by a computer of a system or apparatus (or devices such as a CPU or Microprocessor Unit (MPU)) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium). In an example, a computer-readable medium may store a program that causes an information processing apparatus to perform a method described herein. In another example, a central processing unit (CPU) may be configured to control at least one unit utilized in a method or apparatus described herein.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-177960 filed Aug. 6, 2010, which is hereby incorporated by reference herein in its entirety.

What is claimed is:

1. An information processing apparatus, comprising:
a conversion unit configured to acquire document data from a document management apparatus and convert the acquired document data into print data, wherein, in response to a conversion request received from an external device where, before an output request is received from the external device, due to it being detected that a predetermined document operation is performed on the document data, the conversion unit acquires the document data from the document management apparatus and converts the acquired document data into print data;
a transmission unit configured to transmit, to an image forming apparatus, the print data converted from the document data by the conversion unit; and
an instruction unit configured to instruct the image forming apparatus, wherein, in response to an output request received from the external device due to it being detected that an output operation of outputting the document data is performed, the instruction unit instructs the image forming apparatus to output document data from the print data transmitted from the transmission unit to the image forming apparatus.

2. The information processing apparatus according to claim 1, wherein, if it is determined that the document data is updated from information concerning a history of the document data transmitted together with the output request, the conversion unit converts the updated document data into updated print data.

3. The information processing apparatus according to claim 2, wherein the transmission unit transmits the print data of the document data to the image forming apparatus according to information transmitted from the external device, wherein the information transmitted from the external device indicates whether the print data of the document data is to be transmitted to the image forming apparatus in advance of the information processing apparatus receiving, the output request.

4. The information processing apparatus according to claim 3, wherein, if it is determined that the print data of the document data is not transmitted to the image forming apparatus in response to the information processing apparatus receiving the output request, the transmission unit transmits the print data of the document data to the image forming apparatus in advance of the information processing apparatus receiving the output request.

5. The information processing apparatus according to claim 3, wherein the transmission unit includes a generation unit configured to generate setting data of a format used in the image forming apparatus from information that is transmitted together with the output request and concerns setting for printing the document data designated via a user operation performed on the external device,
wherein outputting performed by the image forming apparatus is printing, and
wherein, if it is determined that the print data of the document data has been transmitted to the image forming apparatus, the transmission unit transmits, to the image forming apparatus, the setting data generated by the generation unit in response to the output request without transmitting the print data.

6. The information processing apparatus according to claim 5, wherein, if it is determined that the print data of the document data has not been transmitted to the image forming apparatus, the transmission unit transmits, to the image forming apparatus, the setting data generated by the generation unit together with the print data of the document data in response to the output request.

7. The information processing apparatus according to claim 3, further comprising:
a selection unit configured to select, from setting data that is preliminarily provided and concerns setting for printing of a format used in the image forming apparatus, setting data corresponding to information that is transmitted together with the output request and concerning setting for printing the document data designated via a user operation performed on the external device,
wherein outputting performed by the image forming apparatus is printing, and
wherein if it is determined that the print data of the document data has been transmitted to the image forming apparatus, the transmission unit transmits, to the image forming apparatus, the setting data selected by the selection unit in response to the output request without transmitting the print data.

8. The information processing apparatus according to claim 7, wherein, if it is determined that the print data of the document data has not been transmitted to the image forming apparatus, the transmission unit transmits to the image forming apparatus, the setting data selected by the selection unit together with the print data of the document data in response to the output request.

9. The information processing apparatus according to claim 1,
wherein a plurality of the image forming apparatuses exists,
wherein the conversion unit converts the document data into print data to be used by each image forming apparatus of the plurality of the image forming apparatuses to output the document data,
wherein, in advance of receiving the output request, the transmission unit transmits to each image forming apparatus of the plurality of the image forming apparatus each corresponding print data converted from the document data by the conversion unit, and
wherein the instruction unit instructs, based on information that is transmitted together with the output request and specifies the image forming apparatus designated through a user operation performed in the external device, one image forming apparatus of the plurality of the image forming apparatuses designated through the user operation to output the document data.

10. The information processing apparatus according to claim 1, wherein the conversion unit converts the acquired document data into print data by converting the acquired document data into an intermediate file format that does not depend upon a model of an image forming apparatus.

11. The information processing apparatus according to claim 1, wherein, prior to receiving an output request from the external device, print setting data is preliminarily generated according to all setting value patterns and stored, and a print setting data corresponding to a designated setting value pattern subsequently is selected and used when an output request is received.

12. The information processing apparatus according to claim 1, wherein, prior to receiving an output request from the external device and after the conversion unit converts the acquired document data into print data, a status message is transmitted from the information processing apparatus to the external device indicating that acquired document data has already been converted into print data by the information processing apparatus.

13. The information processing apparatus according to claim 1,
wherein the predetermined document operation is one of when a document is opened or saved from the external device, and
wherein the conversion request is received from the external device each time it is detected that the document is opened or saved from the external device.

14. The information processing apparatus according to claim 1,
wherein the predetermined document operation is when a document is temporary saved in the external device,
wherein the conversion unit acquires temporary saved document data from the external device and converts the temporary saved document data into temporary saved print data, and
wherein, in response to an output request received from the external device during editing of the document, the transmission unit transmits, to the image forming apparatus, the temporary saved print data and the instruction unit instructs the image forming apparatus to output document data from the temporary saved print data transmitted from the transmission unit.

15. The information processing apparatus according to claim 1,
wherein the predetermined document operation is a passage of a predetermined regular time interval while the document is currently browsed, and
wherein the conversion request is received from the external device each time it is detected that a predetermined regular time interval has passed while the document is currently browsed.

16. The information processing apparatus according to claim 1, further comprising:
an image forming apparatus management information unit having information associated with a user of the external device and available image forming apparatuses, wherein, each time the conversion unit converts the acquired document data into print data, the transmission unit transmits the converted print data to an image forming apparatus, in advance of receiving an output request from the external device, based on the information associated with a user of the external device and available image forming apparatuses in the image forming apparatus management information unit.

17. The information processing apparatus according to claim 16, wherein the transmission unit does not transmit the converted print data to an image forming apparatus in response to an output request received from the external device.

18. A method for using an information processing apparatus in outputting document data, the method comprising:
acquiring document data from a document management apparatus and converting the acquired document data into print data in response to a conversion request received from an external device, before an output request is received from the external device, due to it being detected that a predetermined document operation is performed on the document data;
transmitting, to an image forming apparatus, the print data converted from the document data; and
instructing the image forming apparatus, in response to an output request received from the external device due to it being detected that an output operation of outputting the document data is performed, to output document data from the print data transmitted to the image forming apparatus.

19. A non-transitory computer-readable medium storing a program causing an information processing apparatus to perform a method according to claim 18.

* * * * *